United States Patent
Bishop et al.

(10) Patent No.: US 9,389,103 B1
(45) Date of Patent: Jul. 12, 2016

(54) SENSOR ARRAY PACKAGING SOLUTION

(71) Applicant: LOCKHEED MARTIN CORPORATION, Bethesda, MD (US)

(72) Inventors: James E. Bishop, Newark Valley, NY (US); Allan Johnson, Johnson City, NY (US); Brian Kaplun, Endicott, NY (US); Steven E. McElwain, Jr., Johnson City, NY (US); David L. Vos, Apalachin, NY (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 97 days.

(21) Appl. No.: 14/573,496

(22) Filed: Dec. 17, 2014

(51) Int. Cl.
*G01D 11/00* (2006.01)
*G01D 11/24* (2006.01)

(52) U.S. Cl.
CPC .................... *G01D 11/245* (2013.01)

(58) Field of Classification Search
CPC .................... G01D 11/245; H04N 5/2252
See application file for complete search history.

(56) References Cited

U.S. PATENT DOCUMENTS

| | | | |
|---|---|---|---|
| 2,984,773 A | 5/1961 | Guldemond et al. | |
| 4,833,568 A | 5/1989 | Berhold | |
| 6,163,339 A | 12/2000 | Meunier | |
| 6,535,822 B2 | 3/2003 | Mansky et al. | |
| 2008/0030573 A1 | 2/2008 | Ritchey | |
| 2008/0272453 A1 | 11/2008 | Richardson | |
| 2011/0222307 A1* | 9/2011 | Kong | ............... F21K 9/00 362/554 |
| 2013/0044470 A1 | 2/2013 | Wu et al. | |
| 2013/0235449 A1* | 9/2013 | Suzuki | .......... H01S 3/0405 359/341.1 |
| 2014/0146497 A1 | 5/2014 | Wang et al. | |

* cited by examiner

*Primary Examiner* — Tony Ko

(74) *Attorney, Agent, or Firm* — Kent Kemeny; Andrew M. Calderon; Roberts Mlotkowski Safran Cole & Calderon, P.C.

(57) ABSTRACT

A gigahertz sensor array packaging solution for harsh operating environments is disclosed. The sensor array packaging system includes a structural core body comprising sensor mounting features on a surface thereof and an alignment through hole extending from the surface to a backside thereof which incorporates finned features providing cooling and stiffness. The sensor array packaging system further includes one or more electro-optical components mounted to the backside of the structural core body. The sensor array packaging system further includes a wiring board comprising a plurality of sensor array elements contacting walls of the spiral ribbon configuration, each having a cable extending through the through hole to at least one of the one or more electro-optical components.

20 Claims, 4 Drawing Sheets

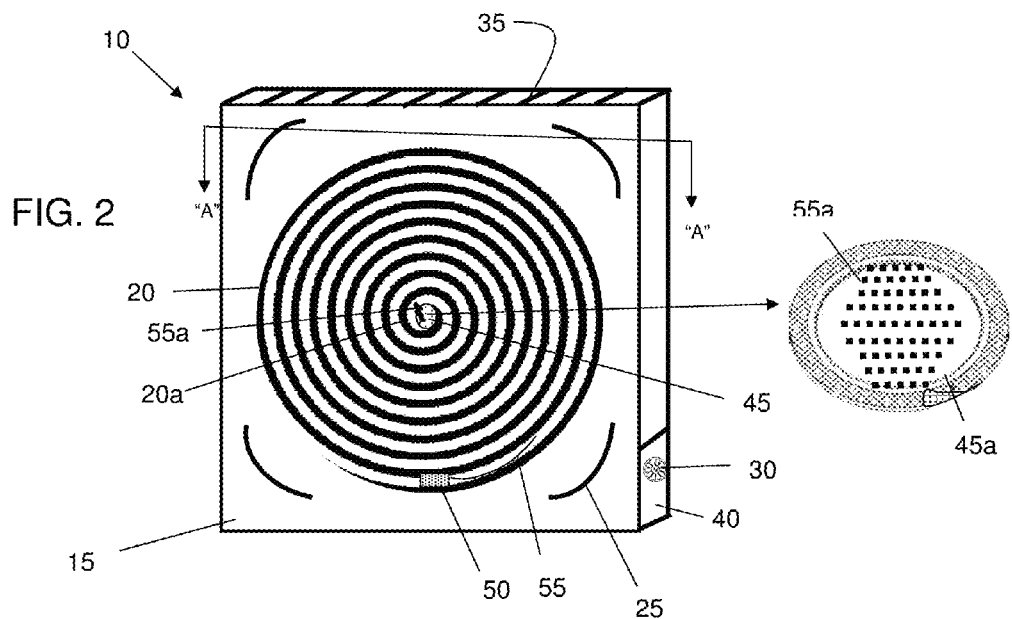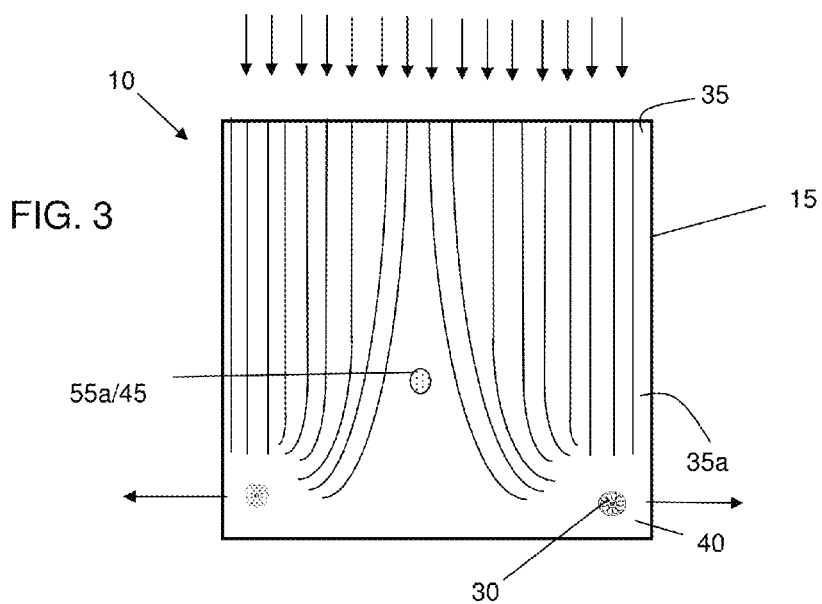

SENSOR ARRAY PACKAGING SOLUTION

FIELD OF THE INVENTION

The invention is directed to a sensor array packaging system. More particularly, the invention is directed to a gigahertz sensor array packaging solution for harsh operating environments.

BACKGROUND DESCRIPTION

A sensor array is a group of sensors deployed in a certain geometric arrangement. Typically, the sensor array pattern is designed to increase antenna gain in the direction of the signal while decreasing the gain in the directions of noise and interferences. In this way, the sensor array pattern is designed to increase signal-to-noise ratio.

The sensor array is deployed in array signal processing systems. These array signal processing systems include, for example, radar/sonar, wireless communications, seismology, machine condition monitoring and fault diagnosis, etc. Radar and sonar applications are typically implemented in aviation environments, including military applications. These environments can be harsh environments, for example, presenting high vibration loads, as well as extreme thermal and other environmental conditions such as high moisture conditions. Also, it is known that the array signal processing systems, e.g., sensors, back end electronics, power supplies, etc. generate a tremendous amount of heat.

To this end, packaging of the sensors and other electro-optical components must protect the components from harsh environmental conditions, while still providing stiffness, relative position, and alignment of the optical interface to the camera, as well as providing heat dissipation in the smallest possible package. These features are competing, though, making it very difficult to accomplish each of the necessary requirements.

SUMMARY OF THE INVENTION

In an aspect of the invention, a sensor array packaging system comprises a structural core body comprising a predetermined configuration on a surface thereof and a through hole extending from the surface to a backside thereof. The sensor array packaging system further comprises one or more electro-optical components mounted to the backside of the structural core body. The sensor array packaging system further comprises a wiring board comprising a plurality of sensor array elements contacting walls of the predetermined configuration, each having a cable extending through the through hole to at least one of the one or more electro-optical components.

In yet another aspect of the invention, a sensor array packaging system comprises a structural core body comprising: a spiral ribbon configuration on a surface thereof; a plurality of fins on the backside thereof and covered by a cover attached to the structural core body; and a through hole at a center of the spiral ribbon configuration extending from the surface to the cover. The sensor array packaging system further comprises one or more electro-optical components mounted to the cover. The sensor array packaging system further comprises a plurality of sensor array elements mounted directly to walls of the spiral ribbon configuration, where each sensor element of the plurality of sensor array elements has a fiber optical cable which is provided within the spiral ribbon configuration and passes through the through hole to at least one of the one or more electro-optical components.

In still yet another aspect of the invention, a sensor array packaging system comprises: a structural core body comprising a spiral ribbon configuration on a surface thereof, and a fin arrangement forming channels from an air inlet to an air outlet on a backside; a cover mounted to the backside of the structural core body, covering the fin arrangement; a through hole extending from the surface of the structural core body to the cover; electro-optical components mounted to the cover on the backside of the structural core body; a wiring board comprising a plurality of sensor array elements directly contacting walls of the spiral ribbon configuration, each having a cable extending through the through hole to the electro-optical components; a radome cover mounted to the structural core body which protects the wiring board and the plurality of sensor array elements; and a back cover mounted to the cover on the backside of the structural core body which protects the one or more electro-optical components.

BRIEF DESCRIPTION OF THE DRAWINGS

The invention is described in the detailed description which follows, in reference to the noted plurality of drawings by way of non-limiting examples of exemplary embodiments of the present invention, in which like reference numerals represent similar parts throughout the several views of the drawings, and wherein:

FIG. 2 shows a plan view of the heat exchanger and structural support for the sensor array packaging solution in accordance with aspects of the present invention;

FIG. 3 shows a cut away view of the heat exchanger and structural support, along line A-A of FIG. 2;

DETAILED DESCRIPTION OF EMBODIMENTS OF THE INVENTION

The invention is directed to a sensor array packaging system. More particularly, the invention is directed to a gigahertz sensor array packaging solution for harsh operating environments. In even more specific embodiments, the invention is directed to a thermal heat exchanger and structural support for electro-optical subassemblies, e.g., sensor array elements and related optical and processing components for a sensor array. In embodiments, the thermal heat exchanger and structural support includes a core structure, preferably of metal, which includes a spiral ribbon configuration (or other configurations) for mounting of sensor array elements, e.g., front end optical module and related components mounted on a printed wiring board (PWB). The spiral ribbon configuration or other configurations provide several advantages, including: (i) heat dissipation (heat transfer); (ii) relative location and alignment of the sensor array elements to related optical and processing components; and (iii) electrical and optical interconnects for the sensor array elements to back end electronics and optical equipment.

Advantageously, the sensor array packaging system provides a packaging solution for harsh environments including, e.g., aviation and marine applications. In further embodiments, for example, the sensor array packaging system is well suited for military applications including helicopter applications which present challenging high vibration environments. By way of illustration, the sensor array packaging system is robust, able to withstand harsh physical vibration and thermal environments, e.g., helicopter flight, as well as exhibits ease of manufacturing and repair. The sensor array packaging system also is designed with minimum mass, compared to conventional systems. Moreover, the sensor array packaging system and, more specifically, the heat exchanger thereof can dissipate large quantities of heat generation, e.g., on the order of −330 watts or more.

Figure 1:
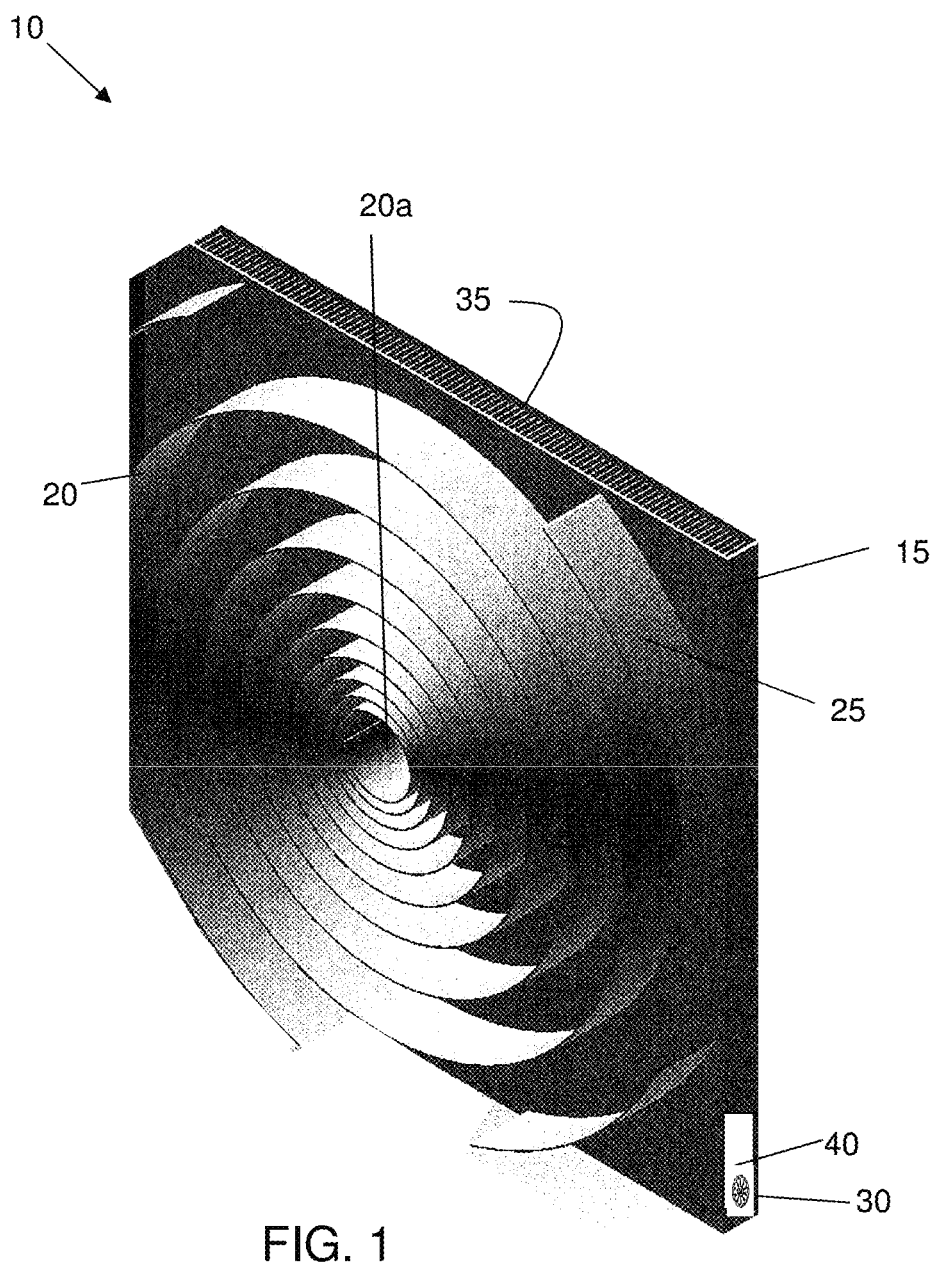
FIG. 1 shows a perspective view of a heat exchanger and structural support for a sensor array packaging solution in accordance with aspects of the present invention.

FIGS. 1 and 2 show a heat exchanger and structural support for a sensor array packaging solution in accordance with aspects of the present invention. More specifically, FIG. 1 shows a perspective view of a heat exchanger and structural support 10 for a sensor array packaging solution; whereas, FIG. 2 shows a plan view of the heat exchanger and structural support 10 for a sensor array packaging solution.

In embodiments, the heat exchanger and structural support 10 includes a core structural body 15. The core structural body 15 acts as a main thermal and structural element of the sensor array packaging system of the present invention. For example, the core structural body 15 provides thermal management and stiff structural support for electro-optical subassemblies, and supports composite housing/radome pieces that provide protection from external environments. Also, the core structural body 15 minimizes structural requirements on the radome and rear cover of the assembly (see, e.g., FIG. 6).

The core structural body 15 can be an aluminum body; although other materials are also contemplated by the present invention. For example, the core structural body 15 (and other components of the heat exchanger and structural support 10) can comprise other metals, alloys, etc. which exhibit high thermal conductivity (W/(m*K)). The material of the heat exchanger and structural support 10 should also exhibit a high stiffness, e.g., minimal deflection on the order of about 0.0001 inch or no deflection, as well as a low mass in order to reduce weight carried by a vehicle, e.g., aircraft.

Still referring to FIGS. 1 and 2, the core structural body 15 includes a spiral ribbon configuration 20 provided on a front face thereof. In embodiments, the spiral ribbon configuration 20 can be machined from the core structural body 15, as an example; although other configurations are also contemplated by the present invention, e.g., welding or other types of bonding or attachment mechanisms. In embodiments, the structure can be manufactured in additional manners including additive manufacturing techniques and 3-D printing as further examples. In embodiments, the spiral ribbon configuration 20 and the core structural body 15 can be a single, unitary (e.g., integral) structure, hence improving heat transfer and structural support capabilities. In embodiments, other configurations are also contemplated by the present invention such as those shown in FIGS. 7a-7d, as described further herein.

As shown more specifically in FIG. 2, the spiral ribbon configuration 20 is configured and structured so as to provide support for a plurality of sensor array elements 50, e.g., 220 sensor array elements, and their respective fiber optical cables 55. To this end, the spiral walls of the spiral ribbon configuration 20 are spaced apart to accommodate the sensor array elements 50 directly mounted to the spiral walls, and their respective fiber optical cables 55. By providing a mounting structure for the sensor array elements 50, the sensor array elements 50 can be thermally and structurally bonded directly to the core structural body 15, and more specifically directly to the walls of the spiral ribbon configuration 20 (or the additional configurations shown in FIGS. 7a-7d). This will, in turn, improve heat dissipation and alignment processes of the sensor array elements 50 with other electro-optical components. The spiral ribbon configuration 20 can also minimize deflection in critical optical image processing components. The spiral ribbon configuration 20 will further accommodate a wide variety of sensor patterns including the "cosine squared example shown while providing a thermal path to the heat sink, e.g., core structural body 15.

Also, and advantageously, the fiber optical cables 55 of the sensor array elements 50 can be draped and mounted to an inside curvature of the spiral ribbon configuration 20, allowing all the fiber optical cables to have equal length. In alternative embodiments, the fiber optical cables 55 can be fed through holes in each of the spiral walls, until it reaches a center location 20a. In this alternative configuration, the fiber optical cables 55 would also be configured to have equal length. In any embodiment noted herein, the different configurations provide for a more compact and efficient method of feeding the fiber optical cables 55 of the sensor element 50 to other electronic components, compared to conventional systems. For example, the fiber optical cables 55 can be wound in a spiral configuration to the center 20a of the spiral ribbon configuration 20, where they can then be fed through a machined through hole 45 (see FIG. 2) to a backside of the core structural body 15.

Still referring more specifically to FIG. 2, the fiber optical bundles 55 terminate (co-located) into a fiber optical comb disk 55a (as shown in the inset of FIG. 2) at the center 20a of the spiral ribbon configuration 20 (or the configurations shown in FIGS. 7a-7d). The fiber optical comb disk 55a can then be inserted through the machined through hole 45 in the center 20a of the spiral ribbon configuration 20. The fiber optical comb disk 55a can be fed to, for example, an optical camera or other electro-optical devices mounted on a backside of the core structural body 15 (see, e.g., FIG. 6). In embodiments, the machined through hole 45 is a tight-tolerance machined tube 45 with spline cuts 45a in order to maintain proper optical alignment between the optical fibers 55 and the optical camera or other electro-optical devices. The tight-tolerance machined tube 45 can also minimize deflections.

As further shown in FIGS. 1 and 2, a plurality of additional heat sink fins 25 can be provided on the surface of the core structural body 15. In embodiments, the heat sink fins 25 are provided remotely from the spiral ribbon configuration 20. Although these heat sink fins 25 are shown on each corner of the core structural body 15, other configurations/patterns are also contemplated by the present invention. For example, the heat sink fins 25 can be placed at edges of the core structural body 15 or at alternate or other combinations of corners and sides of the core structural body 15. In any scenario, the heat sink fins 25 can be machined directly from the core structural body 15, much like the spiral ribbon configuration 20.

The heat exchanger and structural support 10 further includes a forced convection system integrated into the core structural body 15. For example, in embodiments, the forced convection system includes a fan system comprising one or more fans 30, air inlets 35 at a first side or edge of the core structural body 15 and air outlets 40 positioned remotely from the air inlets 35. The one or more fans 30 should preferably be located remotely from the air inlets 35 and adjacent to the air outlets 40. The present invention also contemplates other configurations such as a single fan at a first side of the core structural body 15, with the air inlets 35 at another side of the core structural body 15. The heat exchanger can also be designed to use forced convection from rotor downwash of a helicopter; however, the use of the forced convection system of the present invention may enable operation during ground maintenance without rotors turning.

FIG. 3 shows a cut-away view of the heat exchanger and structural support 10, along line A-A of FIG. 2. In this view, the back cover of the heat exchanger and structural support 10 is removed to show the forced convection system integrated into the core structural body 15. As shown in FIG. 3, for example, the forced convection system includes a plurality of fins 35 extending from the air inlets 35 to the one or more fans 30. In embodiments, the plurality of fins 35a increases the surface area of the heat exchanger for maximum heat dissipation, while also directly channeling air to the one or more fans 30 by way of channels 35b. A lightweight back cover, e.g., aluminum, can be provided over the plurality of fins 35.

The fins 35a can be provided in a fanned configuration, although other configurations are also contemplated by the present invention, depending on the location of the air inlets 35 and the one or more fans 30. For example, the plurality of fins 35a can create parallel channels, when the one or more fans are located on an opposite side of the air inlets 35. Also, the plurality of fins 35a are positioned (e.g., routed) so as to not interfere with the feed through of the fiber optical comb disk 55a through the machined through hole 45 (which extends through the cover). The plurality of fins 35a can be machined from the core structural body 15, much like the spiral ribbon configuration 20.

Figure 4:
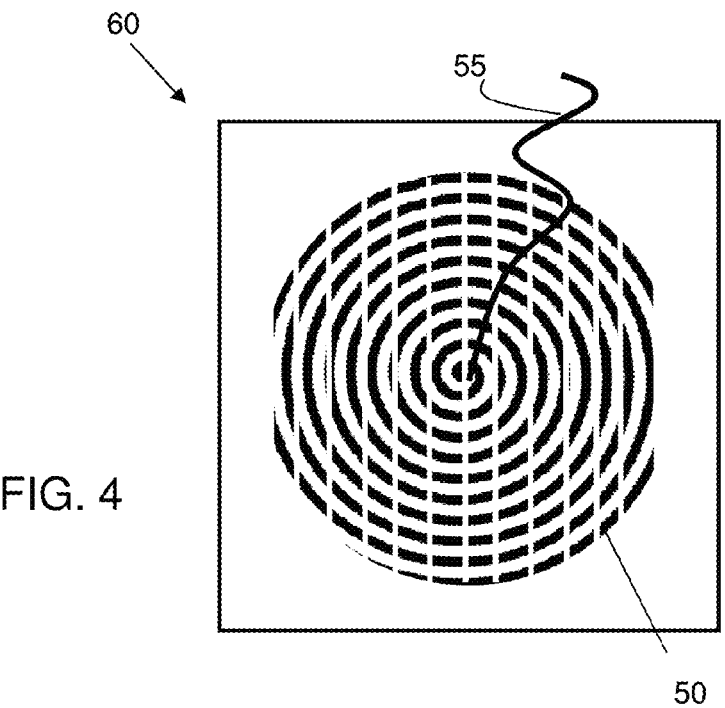
FIG. 4 shows an implementation of a plurality of sensor array elements on a printed wiring board, PWB, which can be mounted to the heat exchanger and structural support shown in FIGS. 1-3.

FIG. 4 shows a plurality of sensor array elements 50 on a printed wiring board, PWB, 60. In embodiments, the sensor array elements 50 are provided as discrete elements in a spiral pattern alignment, to match with the spiral ribbon configuration 20 of the core structural body 15. By matching to the spiral ribbon configuration 20 (or other patterns shown in FIGS. 7a-7d), it is possible to mount the sensor array elements 50 directly onto the walls of the spiral ribbon configuration 20 to improve heat transfer capabilities, as shown representatively and schematically in FIG. 2. In embodiments, the PWB 60 includes 220+ sensor array elements 50 held in a spiral pattern alignment, each with a fiber optical cable represented at reference numeral 55. In embodiments, the fiber optical cable 55 from each sensor element 50 should have a uniform length and terminate in a tightly tolerance array (e.g., fiber optical comb disk 55a as shown in FIG. 2) aligned with an optical camera.

Figure 5:
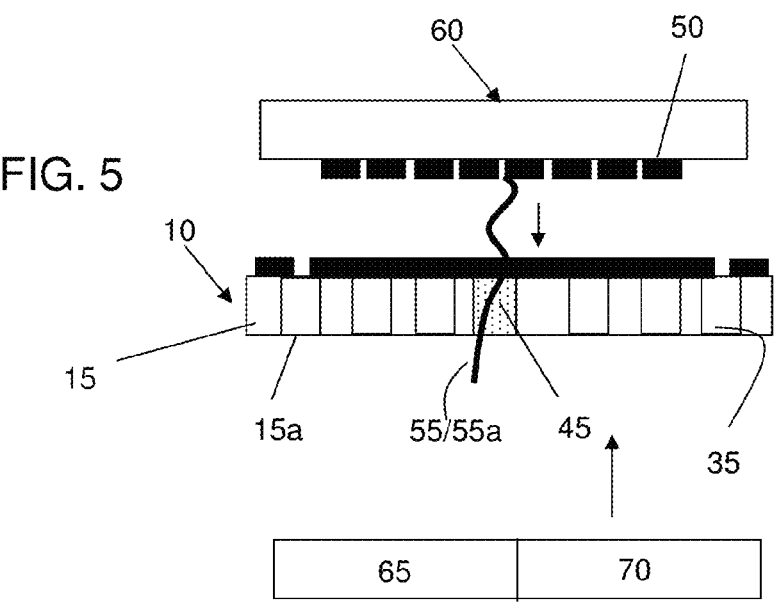
FIG. 5 shows an assembly process of the printed wiring board to the heat exchanger and structural support in accordance with aspects of the present invention.

FIG. 5 shows the assembly process of the PWB 60 to the heat exchanger and structural support 10, i.e., core structural body 15. In the assembly process, the sensor array elements 50 of the PWB 60 are aligned with the spiral ribbon configuration 20 (or other configurations described herein). The sensor array elements 50 of the PWB 60 will then be lowered and bonded directly to the walls of the spiral ribbon configuration 20. The PWB 60 will also be mounted directly to the front face of the core structural body 15. In embodiments, the assembly process will also include the feeding of the fiber optical cables 55 about the spiral ribbon configuration 20, extending through the machined through hole 45 as a fiber optical comb disk 55a. Processing/power components 65 and electro-optical components 70 can be mounted to the back cover 15a of the core structural body 15, with appropriate connection to the fiber optical comb disk 55a. In embodiments, the sensors configuration 20 may be populated prior to attachment to the heat exchanger to aid in manufacturing and repair. For example, the sensors and optical fibers may be soldered to the PWB prior to attachment to the heat exchanger, and still be able to unsolder for repair of individual sensor/fiber elements within the array.

Figure 6:
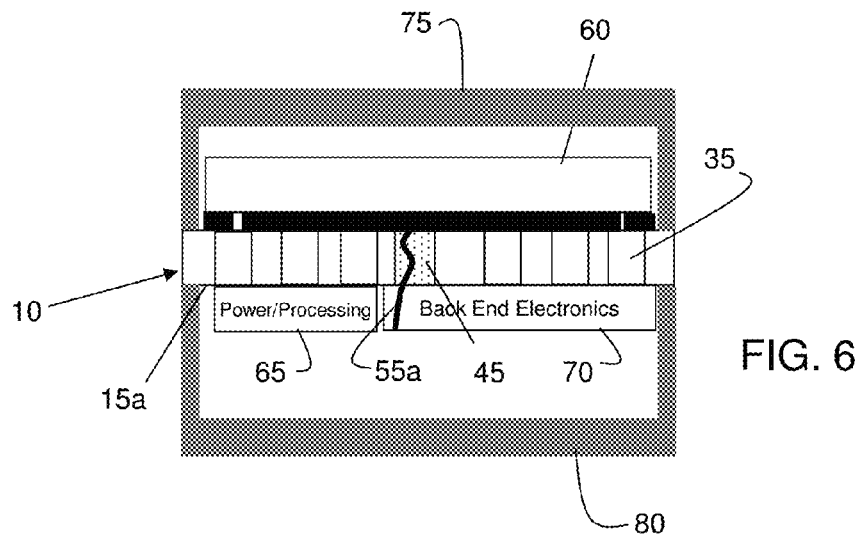
FIG. 6 shows an assembled sensor array packaging solution in accordance with aspects of the present invention.

FIG. 6 shows an assembled sensor array packaging solution in accordance with aspects of the present invention. More specifically, as shown in FIG. 6, the PWB 60 is mounted to the heat exchanger and structural support 10, i.e., core structural body 15. The sensor array elements 50 of the printed wiring board 60 are mounted directly to the walls of the spiral ribbon configuration 20, and the PWB 60 is directly mounted to the core structural body 15. The PWB 60 can be bolted to the core structural body 15; although other fastening mechanisms are also contemplated by the present invention, e.g., adhesive bond, solder, clips, screws, welding, etc.

In embodiments, the fiber optical comb disk 55a is provided through the machined through hole 45 (and the cover 15a), and coupled to the back end electronics 70, via camera optics and related components. The back end electronics 70, e.g., electro-optical elements, and the power/processing unit 65 are mounted to the back cover 15a of the core structural body 15. In embodiments, the back end electronics 70, e.g., electro-optical elements, and the power/processing unit 65 can be bolted to the core structural body 15; although other fastening mechanisms are also contemplated by the present invention, e.g., clips, screws, etc. A rear cover 75 is mounted to the core structural body 15; whereas, a radome 80 is mounted to a front face of the core structural body 15. In embodiments, the rear cover 75 and radome 80 can be mounted by bolts, in a pattern dictated by electromagnetic interference (EMI).

Figure 7A:
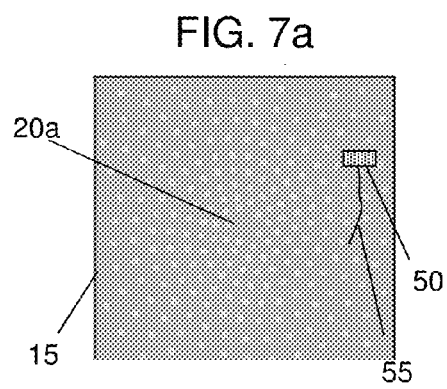
FIGS. 7a-7d show additional array patterns for a heat exchanger and structural support in accordance with aspects of the present invention.
Figure 7B:
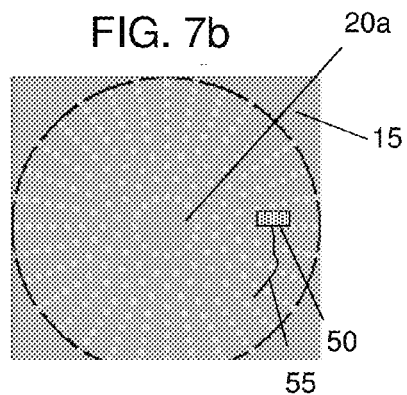
Figure 7C:
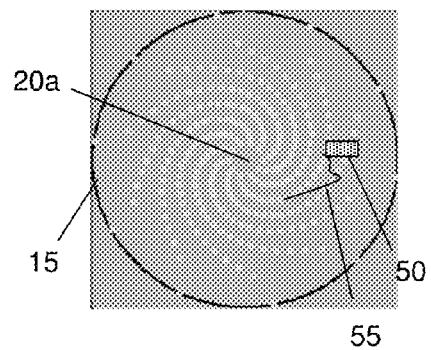
Figure 7D:
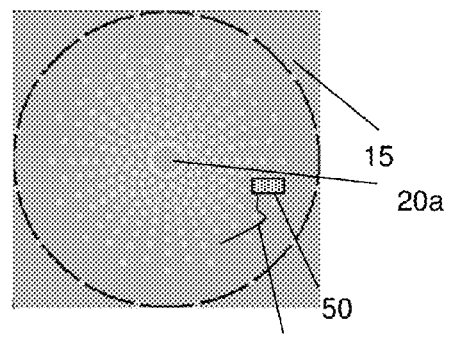

FIGS. 7a-7d show different configurations as contemplated by the present invention. These different configurations include, e.g., modified spiral or radial configuration (FIGS. 7a and 7c), enlarged sunburst configuration (FIG. 7b) and compact stunburst configuration (FIG. 7d). It should be understood that the features/elements described with regard to FIGS. 1-6 can also equally be implemented in these different configurations, e.g., fiber optical comb disk, machined through hole (tight-tolerance machined tube with spline cuts), heat sink fins, etc.

In each of these embodiments, the walls can be intermittently spaced apart walls; although or can be solid walls. As shown more specifically in FIGS. 7a-7d, the different ribbon configurations are configured and structured so as to provide support for a plurality of sensor array elements 50, and their respective fiber optical cables. To this end, the walls of the each configuration are spaced apart to accommodate the sensor array elements 50 directly mounted to the walls, and their respective fiber optical cables 55. By providing a mounting structure for the sensor array elements 50, the sensor array elements 50 can be thermally and structurally bonded directly to the core structural body 15, and more specifically directly to the walls of the different configurations. This will, in turn, improve heat dissipation and alignment processes of the sensor array elements 50 with other electro-optical components. The configurations shown in FIGS. 7a-7d can also minimize deflection in critical optical image processing components, and will further accommodate a wide variety of sensor patterns including the "cosine squared example shown while providing a thermal path to the heat sink, e.g., core structural body 15.

Also, and advantageously, the fiber optical cables 55 of the sensor array elements 50 can be draped and mounted to curvature of the configuration 20, allowing all the fiber optical cables to have equal length. In alternative embodiments, the fiber optical cables 55 can be fed through holes in each of the walls, until it reaches a center location 20a. In this alternative configuration, the fiber optical cables 55 would also be configured to have equal length. In any embodiment noted herein, the different configurations provide for a more compact and efficient method of feeding the fiber optical cables 55 of the sensor element 50 to other electronic components, compared to conventional systems. For example, the fiber optical cables 55 can be wound in the appropriate configuration to the center 20a of the each different configuration, where they can then be fed through a machined through hole 45 (see FIG. 2) to a backside of the core structural body 15.

As should now be understood, the present invention provides many advantages over conventional systems. For example, the sensor array packaging solution of the present invention provides an integration of electro-optical integration of components into a single package which minimizes mass and assembly labor. By way of illustration, again, the core structural body 15 becomes the "central spine" for mounting the front radome, as well as sensor array elements, fiber optics, camera, supporting electronics, cooling fans, and rear cover. Also, by implementing the sensor array packaging solution of the present invention, a lightweight back cover and front radome materials are only required to protect the assembly from external environments, allowing for minimum weight. The integration of thermal and structural solutions into one component also minimizes mass while withstanding the harsh physical vibration and thermal environments of, e.g., helicopter flight. The front surface, e.g., spiral ribbon configuration, of the heat exchanger also provides relative location as well as electrical connection for the sensor array elements.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, and combinations thereof such as are within the scope of the appended claims.

What is claimed is:

1. A sensor array packaging system, comprising:
   a structural core body comprising a predetermined configuration on a surface thereof and a through hole extending from the surface to a backside thereof;
   one or more electro-optical components mounted to the backside of the structural core body; and
   a wiring board comprising a plurality of sensor array elements contacting walls of the predetermined configuration, each having a cable extending through the through hole to at least one of the one or more electro-optical components.

2. The sensor array packaging system of claim 1, wherein the cables are fiber optical cables provided within the predetermined configuration and arranged as a fiber optical comb disk extending through the through hole.

3. The sensor array packaging system of claim 2, wherein the fiber optical cables for each of the sensor array elements are of a same length.

4. The sensor array packaging system of claim 1, wherein the structural core body and the predetermined configuration are a single, unitary component, and the predetermined configuration is a spiral ribbon configuration.

5. The sensor array packaging system of claim 1, wherein the plurality of sensor array elements are configured in an arrangement corresponding to the predetermined configuration.

6. The sensor array packaging system of claim 1, further comprising a forced convection system comprising one or more fans, air inlets and one or more air outlets.

7. The sensor array packaging system of claim 6, further comprising channels formed from a plurality of fins on the backside of the structural core body, leading from the air inlets to the one or more fans.

8. The sensor array packaging system of claim 7, wherein the plurality of fins and the structural core body are a single, unitary component.

9. The sensor array packaging system of claim 1, further comprising one or more heat sink fins positioned on the surface of the structural core body, remotely from the predetermined configuration which is a spiral ribbon configuration or a sunburst configuration.

10. The sensor array packaging system of claim 1, further comprising a radome cover and a back cover mounted to opposing sides of the structural core body, protecting the plurality of sensor array elements and the one or more electro-optical components body, respectively.

11. A sensor array packaging system, comprising:
   a structural core body comprising:
      a spiral ribbon configuration on a surface thereof;
      a plurality of fins on the backside thereof and covered by a cover attached to the structural core body; and
      a through hole at a center of the spiral ribbon configuration extending from the surface to the cover; and
   one or more electro-optical components mounted to the cover; and
   a plurality of sensor array elements mounted directly to walls of the spiral ribbon configuration, where each sensor element of the plurality of sensor array elements has a fiber optical cable which is provided within the spiral ribbon configuration and passes through the through hole to at least one of the one or more electro-optical components.

12. The sensor array packaging system of claim 11, wherein the fiber optical cables are arranged as a fiber optical comb disk at the center of the spiral ribbon configuration, which extends through the through hole.

13. The sensor array packaging system of claim 12, wherein the fiber optical cables for each of the sensor elements are of a same length.

14. The sensor array packaging system of claim 11, wherein the structural core body, the spiral ribbon configuration and the plurality of fins are a single, unitary component.

15. The sensor array packaging system of claim 11, wherein the plurality of sensor array elements are in a spiral arrangement corresponding to the spiral ribbon configuration.

16. The sensor array packaging system of claim 11, wherein the through hole is a splined through hole for alignment.

17. The sensor array packaging system of claim 11, wherein the plurality of fins form channels leading from air inlets to one or more fans of a forced air convection system.

18. The sensor array packaging system of claim 11, further comprising one or more heat sink fins positioned on the surface of the structural core body, remotely from the spiral ribbon configuration.

19. The sensor array packaging system of claim 11, further comprising a radome cover and a back cover mounted to opposing sides of the structural core body, protecting the plurality of sensor array elements and the one or more electro-optical components body, respectively.

20. A sensor array packaging system, comprising:
- a structural core body comprising a spiral ribbon configuration on a surface thereof, and a fin arrangement forming channels from an air inlet to an air outlet on a backside;
- a cover mounted to the backside of the structural core body, covering the fin arrangement;
- a through hole extending from the surface of the structural core body to the cover;
- electro-optical components mounted to the cover on the backside of the structural core body;
- a wiring board comprising a plurality of sensor array elements directly contacting walls of the spiral ribbon configuration, each having a cable extending through the through hole to the electro-optical components;
- a radome cover mounted to the structural core body which protects the wiring board and the plurality of sensor array elements; and
- a back cover mounted to the cover on the backside of the structural core body which protects the one or more electro-optical components.

* * * * *